United States Patent [19]

Mc Cutchen

[11] 4,002,882
[45] Jan. 11, 1977

[54] HEATING CIRCUIT

[76] Inventor: Charles W. Mc Cutchen, 5213 Acacia Ave., Bethesda, Md. 20014

[22] Filed: Mar. 5, 1975

[21] Appl. No.: 555,642

[52] U.S. Cl. .............................. 219/499; 219/497; 219/504
[51] Int. Cl.² .......................................... H05B 1/02
[58] Field of Search .......... 219/490, 494, 497, 499, 219/501, 504, 505

[56] References Cited
UNITED STATES PATENTS

| | | | |
|---|---|---|---|
| 2,918,558 | 12/1959 | Evans | 219/499 |
| 3,215,818 | 11/1965 | Deaton | 219/499 |
| 3,702,921 | 11/1972 | Thelen | 219/497 X |

*Primary Examiner*—J. D. Miller
*Assistant Examiner*—Fred E. Bell
*Attorney, Agent, or Firm*—Philip G. Cooper

[57] ABSTRACT

An energizing circuit for applying maximum electrical power to a heatable element having, at least, a high initial thermal lag. By sensing the resistance of the element, which varies as a function of its temperature, a control voltage is obtained which is used to vary the effectiveness of the heating current so as to provide rapid initial heating without the danger of burn-out. More specifically, the circuit is useful in energizing the glowplug of a model airplane engine.

Current pulses are obtained from a storage battery which is connected in series with the glowplug and a semiconductor switch. The switch is turned on and off by a multivibrator to produce a series of current pulses. The duration of each "on" pulse is controlled by a bridge circuit which senses the resistance of the glowplug, which is a function of its temperature, and produces a control voltage which varies the timing of the multivibrator. The energizing circuit is manually disconnected as soon as the engine starts and may be accidentally short-circuited when the connecting leads are dropped. A control circuit is therefore provided for sensing such a short circuit and shutting off the current. A further control circuit may also be included for minimizing overheating resulting from contact transients set up when initial or erratic contact is made with the glowplug. In addition, the circuit is designed so that when the contact is removed from the glowplug the control circuits are deactivated automatically and the circuit draws no stand-by current from the battery. Undesired effects that may occur as the battery becomes discharged are also taken into account.

11 Claims, 2 Drawing Figures

HEATING CIRCUIT

BACKGROUND OF THE INVENTION

1. Field of the invention

This invention relates to a device for quickly heating a heatable element which has a high thermal lag, at least initially. The term "thermal lag," as used herein, refers to the fact that when electrical power is applied to a heatable element that is thermally loaded by its own or by neighboring material that absorbs heat, the rise in temperature lags behind the temperature that would exist in the absence of such material. An electrical iron, a soldering iron or an electric stove element are examples of this. It is known that considerable time must elapse before the device comes up to its desired temperature. The thermal load may change during the heating process. For example, the glowplug of a model airplane engine may be "drowned" by the introduction of priming fuel, as will be explained later. As soon as the priming fuel has been evaporated, however, the thermal load is greatly reduced and the glowplug temperature now rises rapidly. This invention is applicable both to the case where the thermal load, and thus the lag, is essentially constant as well as to the case where the thermal lag is high initially.

2. Description of the Prior Art

Small internal combustion engines that are commonly used to power model airplanes are usually equipped with a glowplug to provide ignition. The glowplug contains a filament which is heated by a battery just before the engine is to be started. After the engine has started the battery is disconnected from the glowplug and from then on the combustion of fuel within the engine keeps the glowplug hot enough to cause ignition.

In order to start such a small engine, it is usually necessary to prime it by injecting liquid fuel into the combustion chamber, either through the exhaust port or via the carburator, as is well known. This act frequently drowns the plug and prevents it from attaining the necessary temperature. The reason is that the heat conductivity, heat capacity, and heat of vaporization of the liquid fuel are so high that heat is conducted away from the glowplug filament very easily; so easily that when heated by the usual battery source of energy the heating element of the glowplug fails to get hot, the liquid fuel is evaporated slowly at best, and the engine will not start. Thus, an engine wet enough to run if it had ignition is likely not to have any. One dry enough to ensure ignition, i.e., in which the glowplug is not drowned, will not willingly start. This problem is particularly acute in cold weather because the fuel is then hard to vaporize. It is also a problem when the engine is used in an inverted position, since in that case the glowplug is at the bottom of the combustion chamber where liquid fuel will naturally gather. However, the problem where liquid fuel will naturally gather. However, the problem is not limited to cold weather or to inverted engines, by any means.

It might at first appear that this problem could be solved simply by using a higher starting voltage so as to apply more power to the glowplug. However, if this should be done the added heat would, indeed, evaporate the liquid fuel and dry out the filament more quickly, but as soon as this happened the temperature of the filament would rise above that for which it had been designed, and it would burn out. It is impractical, therefore, to apply to the glowplug a fixed voltage in excess of the voltage for which it has been designed. Accordingly, starting the engine remains a frustrating process of skill, patience and time, with success rewarding those who hit the lucky amount of priming which starts the engine without drowning the glowplug.

SUMMARY OF THE INVENTION

In its broader aspects this invention relates to circuit means for heating a heatable element having a high thermal lag, at least initially, by means of a high level of heating energy so long as the temperature of the element does not exceed a predetermined value and then reducing the applied power when the temperature at the element increases. Since the resistance of an element is a function of its temperature, means is provided to sense the resistance of the element being heated to obtain a control voltage related to its temperature, and to use such a control voltage to vary the effectiveness of a source of heating current so as to prevent the temperature of the element from exceeding some safe value. More particularly, a storage battery is used which has more than enough voltage and current capacity to overheat the element if left connected to it. However, a switching circuit is provided which is able to supply short pulses of current under the control of the control voltage. In a preferred application of the invention, the system is used to heat the glowplug of a model airplane internal/combustion engine. The invention also encompases circuitry which will (1) sense a short circuit which might occur if the leads to the glowplug were to be removed carelessly, (2) provide for shutting the apparatus off automatically to conserve battery energy when the leads are disconnected from the glowplug, (3) prevent overheating that might result from intermittent contact with the glowplug, and (4) take into account problems that might arise as the storage battery becomes discharged.

BRIEF DESCRIPTION OF THE DRAWING

FIG. I is a diagrammatic circuit diagram of the invention in its broader aspect, and FIG. II is a circuit diagram of a preferred embodiment of the invention.

DESCRIPTION OF THE DRAWINGS

Figure 1:
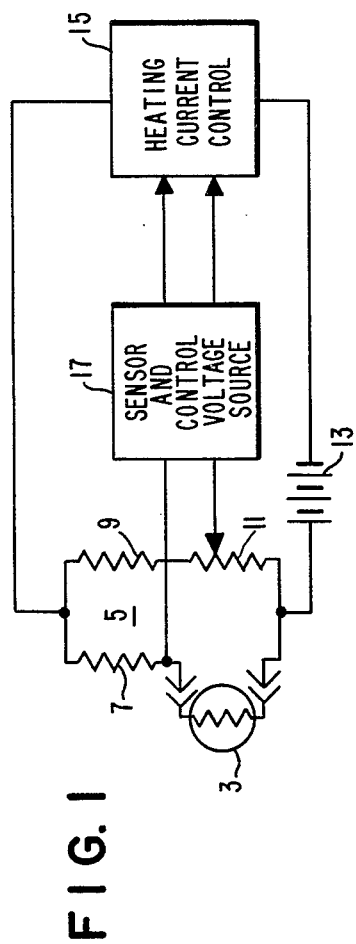
Figure 2:
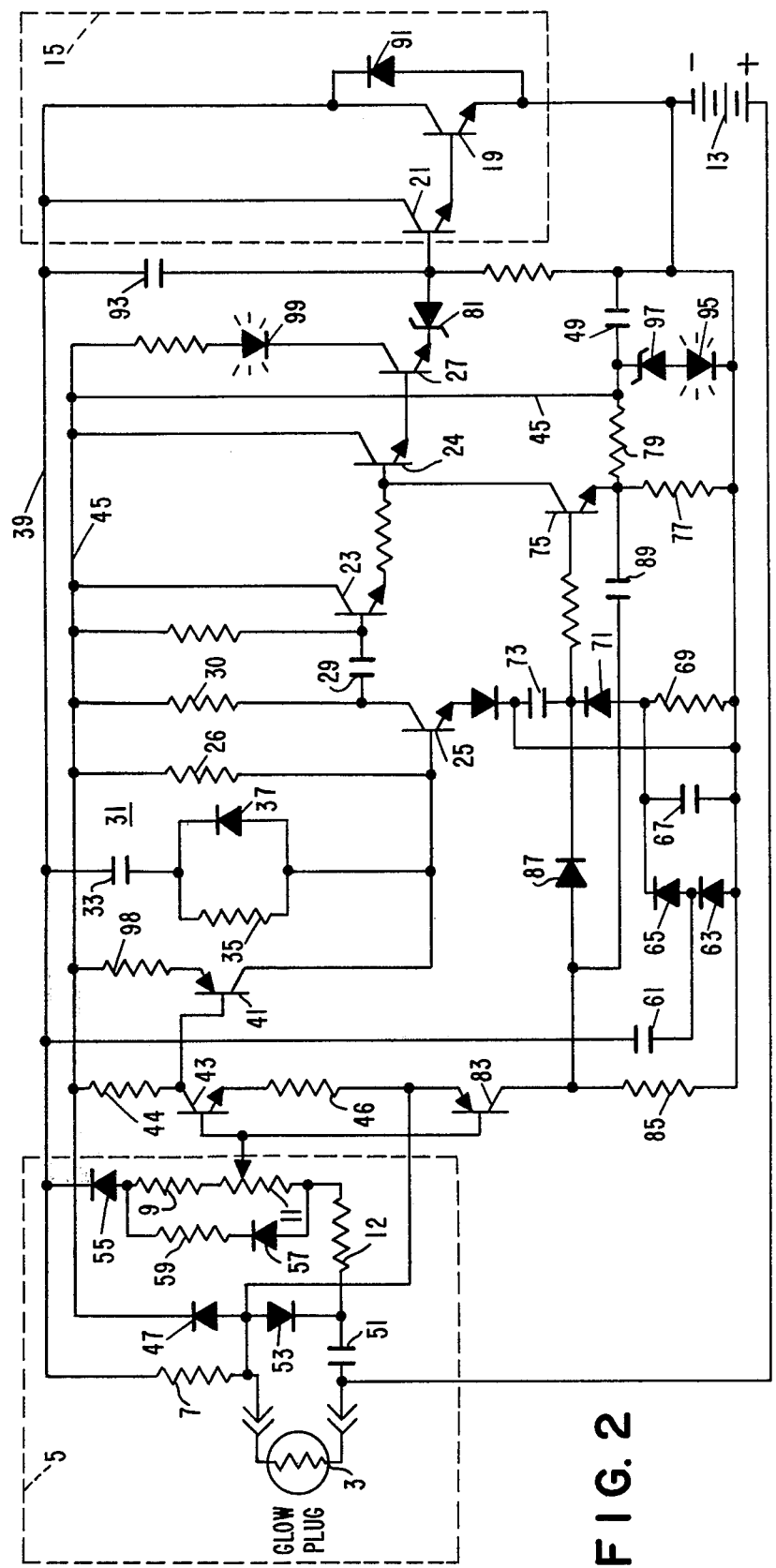

Referring to FIG. I, reference numeral 3 identifies a glowplug that is in place in a small internal combustion airplane engine. Connections to it are made through a contact clip generally represented by the arrow heads on the connecting lines. The glowplug is included as one leg of a Wheatstone Bridge 5 consisting also of resistors 7, 9 and 11. Resistor 7 has a resistance value which is very low, preferably lower than the resistance of the glowplug itself. For example, it may have a value of 0.125 ohms. The other arm of the bridge should have considerably higher resistance since it is not to carry the heating current. The output voltage, representative of a condition of unbalance, is taken from the junction of the glowplug 3 and resistor 7, on the one hand, and from a movable contact point on resistor 11 on the other. Resistor 11 may be, for example, a 500 ohm potentiometer.

Power is supplied from battery 13 which is connected in series with the bridge network and a Heating Current Control device 15 which is essentially a switch which acts to interrupt the current from battery 13 under the control of a voltage applied to its input terminals from a Sensor and Control Voltage Source 17. The latter device controls the opening and closing of the Heating Current Control to produce current pulses spaced at essentially constant intervals of, say, 13 milliseconds, but of variable time length. The pulses are applied to the load circuit including glowplug 3. The Sensor 17, in turn, is under the control of the output voltage from the bridge 5 in such a way that as the temperature, and thus the resistance, of the glowplug increases the unbalance voltage from the bridge acts on the Sensor 17 to shorten the length of the current pulses, and vice versa. When the filament temperature is low the pulses may last up to 6 milliseconds, or so, so as to provide maximum heating effectiveness and to insure fast evaporation of the liquid fuel. As the temperature of the glowplug filament increases the control system reduces the duty cycle or length of the pulses to something of the order of 0.2 to 0.5 milliseconds. Depending upon the resistance of the glowplug, the current pulses may have a magnitude of about 10 amperes, more or less.

Referring now to FIG. II, a complete circuit diagram is given in which corresponding elements bear the same reference numerals as in FIG. I. As indicated before, the battery 13 is connected to the glowplug 3 through resistor 7 and through a switch which is now seen to take the form of the collector-emitter path of an NPN power transistor 19. If desired, two or more transistors may be used in parallel to increase the current capacity. The base electrode of transistor 19 is connected to the emitter of a driver transistor 21, and these elements constitute the Heating Current Control 15 of FIG. I. Transistors 19 and 21 form a Darlington circuit. Alternatively transistor (or transistors) 19 may be PNP rather than NPN, connected emitter to line 39, collector to battery minus, base to line 39 via a 1000 ohm resistor, and directly to the collector of transistor 21, whose emitter is now connected to battery minus. This arrangement is known as a complementary Darlington circuit.

The driver transistor 21 is, in turn, driven by a string of emitter-follower transistors 23, 24 and 27. All of these transistors together form one half of a multivibrator. The other half is transistor 25. Capacitor 29 is connected between the collector and its load resistor 30 of transistor 25 and the base of transistor 23 thus providing a feedback path for multivibrator operation. The other feedback path is through the timing circuit 31 which includes capacitor 33 connected in series with parallel-connected resistor 35 and diode 37, between the collector of the power transistor 19, via line 39, and the base of the multivibrator transistor 25. When transistor 25 is off, that is when it is non-conducting, the emitter-follower chain including the power transistor 19, will conduct, and visa versa. Also note that the feedback is such that each portion of the multivibrator feeds to the other a control voltage which will change its operating condition. Thus, assuming that the emitter-follower chain starts to conduct, the low impedance of the power transistor 19 pulls conductor 39 down almost to the negative battery potential. This negative-going pulse is passed to the base of transistor 25 by the capacitor 33 and the timing circuit, thus cutting off transistor 25. When the resulting charge on capacitor 33 leaks off, however, transistor 25 will begin to conduct again by reason of the positive voltage applied to it through resistor 26. This will pull its collector down toward the negative battery (ground) potential and the resulting pulse will be applied to the base of transistor 23 by capacitor 29 and the emitter-follower chain will be shut off and the current through the power transistor will stop.

The timing circuit is effectively shunted by the collector-emitter path, including stablizing resistor 98, of a PNP error amplifier transistor 41. Accordingly, the rate at which the timing circuit functions will be determined by the current flow in this shunt circuit. This current is determined by the error or unbalance voltage of the bridge network which is sensed by error transistor 43, the base of which is connected to potentiometer 11. Its output, taken across load resistor 44, is coupled to the base of amplifier transistor 41. The emitter of 43 ties back to the mid-point of the glowplug arm of the bridge through stablizing resistor 46.

When the temperature of the glowplug is too high its resistance increases, the bridge is unbalanced and the current through transistor 43 increases. This current is amplified by transistor 41. The amplified current speeds the discharge of capacitor 33 that holds transistor 25 cut off (at which time the power transistor 19 is on), which accordingly allows transistor 25 to conduct sooner and shortens each pulse of heating current to reduce its duty cycle, tending to reduce the temperature of the glowplug. If the glowplug is too cold, transistor 41 feeds less current to the capacitor 33 and the pulses are longer. When the glowplug is much too cold, as when it is wet by the liquid fuel, transistor 41 is cut off entirely, and the capacitor 33 is discharged only by the current through the base of transistor 25, limited by the 15,000 ohm current-limiting resistor 35. This gives the maximum duty cycle, which is a pulse length of about 6 milliseconds. The normal temperature of the glowplug may be set by adjusting potentiometer 11.

The purpose of diode 37 and resistor 35 is to limit the base current of transistor 25 during the charging of capacitor 33 when the collector of transistor 19 goes positive at the end of each heating current pulse, yet still to present a low impedance path to the negative-going step at the beginning of each current pulse. In the former case the diode is back-biassed, so the charging current must flow through resistor 35. In the latter case the diode conducts.

Current to run the sensing and control portions of the circuit is derived from line 45 which is connected to the cathode of diode 47, the anode of which is connected to the junction of the glowplug and the series resistor 7. For this reason these portions of the circuit draw no stand-by current from the battery when the contacts have been removed from the glowplug. It will be noted that the only d.c. connection from the operating circuitry to the positive terminal of the battery is made through the glowplug. However, when the glowplug is connected, and when no heating current is flowing, the potential at the glowplug and at the anode of diode 47 is of the order of 12 volts positive. This voltage charges the large 1000 microdarad capacitor 49, which is connected directly between lead 45 and the negative battery terminal, to a potential of 12 volts minus a 0.6 volt diode drop. Lead 45 therefore becomes positive and is held at that potential by capacitor 49. During current pulses the voltage at the anode of diode 47 drops about 8 volts, but the capacitor 49 cannot discharge through it because the diode 47 is then reverse biassed. Consequently the circuit continues to operate during current pulses bby reason of the charge on the large capacitor 49. This feature makes it unnecessary to throw a switch to turn the device off when the engine has started and the clips are removed from the glowplug. The load on the battery is shut off automatically. Ordinarily one would expect the lower terminals of both bridge arms to be connected together. Note that in my preferred circuit they are not. Instead, the lower terminal of the comparison arm of the bridge, containing resistors 9, 11 and 12, is connected to the lower terminal of the glowplug arm by a large 1000 microfarad capacitor 51. In addition the cathode of a diode 53 is connected to one terminal of the capacitor 51 while its anode is connected to the other terminal through the glowplug. When the clip leads are disconnected from the glowplug no d.c. current can flow into either arm of the bridge circuit and, as is desired, no stand-by current will flow at all. However, as soon as the clips are connected to the glowplug and a heating current starts, line 39 goes toward ground, as previously indicated, and a charging current flows from positive battery, through capacitor 51 and the right-hand arm of the bridge, including diode 55, to line 39. However, diode 53 is poled so that it will conduct and tend to discharge the capacitor during periods when the power transistor is not conducting. The net result is that the capacitor assumes a low charge roughly equal to the diode drop across diode 53, and the voltage remains fairly constant over the operating cycle because of the large value of capacitor 51. Thus during the current pulse, which is when the bridge is used, capacitor 51 behaves almost like a short circuit, so it has little effect on the operation of the bridge. Furthermore, since the capacitor 51 is returned to the positive battery terminal it is effectively in series with the battery so far as the comparison arm of the bridge is concerned. This tends to compensate for the fact that the internal resistance of a battery increases as it runs down, and that its terminal voltage under load drops faster as it discharges than does its non-load terminal voltage. By returning both arms of the bridge to the same point any bridge unbalance that might otherwise result is avoided.

It will be observed from FIG. II that diode 55 is connected in series with the right hand comparison arm of the bridge, between conductor 39 and resistor 9. Also note that a second diode 57 and a resistor 59 are connected across the bridge resistors 9 and 11. The purpose of these diodes is to compensate for the base-to-emitter bias of transistor 43. That is, the potential at the arm of the potentiometer is raised above ground potential by an amount roughly equal to the normal drop from base to emitter of transistor 43 so that its normal or balanced base potential and the potential at the bridge output will be equal.

It has been pointed out earlier that a connector clip is used to connect the power circuit to the glowplug. It has been found that in attaching the clip to the plug electrical contact is made and broken many times before the final connection is established. This is common behavior for ordinary metallic contacts. The consequent repeated voltage transients cause the power circuit to give more current pulses than it should. As a result, a dry plug may be burned out in the process of connecting it to the power source. An optional feature has been provided it to the power source. An optional feature has been provided to overcome this problem. The circuit in question may be called an Anti-Multipulse Circuit, since it compensates for too many current pulses which effectively increase the duty cycle of the heating current by triggering the multivibrator more frequently than it should be triggered.

A 10 microfarad capacitor 61 is connected between conductor 39 and the mid-point of a pair of diodes 63 and 65 which constitute a so-called diode pump. The anode of diode 63 goes to ground while the cathode of diode 65 is connected to a capacitor 67, and to a resistor 69 and thence through a diode 71 to a 10 microfarad capacitor 73 and to the base electrode of a transistor 75, through an isolating resistor. Capacitor 67 and resistor 69 are both returned to ground so that they are in shunt with the diode pump. The other terminal of capacitor 73 also goes to ground so that it holds any voltages that are applied to the base of transistor 75. The operation of this circuit is as follows: each time the potential of line 39 goes positive following a heating pulse an increment of voltage is fed through the diode pump into capacitor 67. Normally each increment largely leaks away through resistor 69 before the next pulse arrives. But if the pulses follow one another too quickly because of transient pulses generated by sparking contacts at the glowplug, then they will pump the base of transistor 75 up to more than 0.6 volts above 3 volts, the point at which the divider chain of resistors 79 and 77 is holding its emitter. Therefore transistor 75 will conduct, and it will stay conducting until its base current has discharged the charge on capacitor 73. This holds the base of transistor 24, which is in the emitter follower chain, at such a low potential that it will not conduct, the power transistor will not be turned on and no current will go through the glowplug.

Earlier, mention was made of another alternative feature of this circuit in accordance with which the power is automatically turned off when the clip has been removed from the glowplug, after the engine has started. It has been observed that at this moment the user is giving his undivided attention to the airplane and may accidentally drop the clip in a way which causes it to become short-circuited. This could run the battery down if it were not noticed. A further feature of this invention provides a circuit to prevent this.

The anti-short circuiting circuit begins with a transistor 83 the base of which is connected to the output of the bridge network at the arm of potentiometer 11. Its emitter is connected to the midpoint between the glowplug and the series resistor 7. Its collector goes to ground through a load resistor 85 and to the anode of a diode 87, the cathode of which is connected to the ungrounded terminal of capacitor 73 and thus to the base of transistor 75. The anode of 87 is coupled through a 0.22 microfarad capacitor 89 to the emitter of transistor 75.

This "anti-short circuit" feature operates as follows: a short circuit at the glowplug clip makes the potential of the emitter of transistor 83 go up toward battery positive voltage so that it is much more positive than usual. Incidentially, such a short also unbalances the bridge in the direction that tends to make the heating current come on full blast since the sensing circuit would think that the glowplug temperature is too low. Normally transistor 83 is cut off, but now it conducts heavily, charging up the capacitor 73 across the base of transistor 75, making it conduct and, as before, transistor 24 is shut off. At the same time a positive pulse is applied through capacitor 89 to the emitter of transistor 75. this briefly delays the conduction of transistor 75 and allows capacitor 73 to become heavily charged before the system is cut off. As before, conduction in transistor 75 stops the heating current, but in this case the current stops for about 1/5 second as capacitor 73 is slowly discharged by the base current of transistor 75. The circuit then tries another current pulse and is stopped again if the short remains, and so on until the short is removed. The drain on the battery while this is going on is less than 100 milliamperes which is much less than the drain during normal operations.

The Zener diode 81 is placed between the base of transistor 21 and the emitter of transistor 27 so that during heating current pulses the base of transistor 24 is at a higher (more positive) potential relative to the negative terminal at the battery than it would be if the Zener diode 81 were omitted. This higher potential allows the clamp transistor 75 to shut off the heating current when its emitter collector potential is high enough so its current gain is high, and at the same time allows its emitter potential to be set high enough by resistors 77 and 79 so that the diode pump and anti-short circuit feedback operate with voltage excursions large compared to the non-linear range of diodes 63, 65, 71, and 87, and transistor 75. This ensures that these feedback paths, the anti-multipulse and anti-short circuit feedbacks are completely inactive when not needed, yet powerful when in operation.

A high current capacity diode 91 may be connected between the collector and emitter of the power transistor 19 to protect it in case the battery should ever be accidentally connected to the circuit in reversed polarity. The relatively inexpensive glowplug would then act as a fuse and blow out, but the more expensive power transistor would be saved.

Glowplug engines are frequently started in proximity to radio-controlled planes. In order to minimize any possible radiation interference with the flying planes, a 0.02 microfarad capacitor 93 may be connected across the collector-base path of transistor 21. This will round off the corners of the pulses and reduce the generation of undesired harmonics. Shielding may also be used if desired.

Various indicator lights may also be employed. FIG. II illustrates the use of a light emitting diode 99, for example red, to indicate whether the circuit is 1) properly connected, 2) short circuited or 3) disconnected. The LED is connected in series with the collector of transistor 27. When the multivibrator operates, the light will flash, but so rapidly that it will appear steady. When the plug clips are short circuited the light will flash on and off five times per second as a warning. When the circuit is disconnected the LED is, of course, out.

Another LED, 95, preferably of a different color, may be connected in series with a Zener diode 97 between the positive voltage line and ground. This diode will light whenever the glowplug is connected, provided that the voltage between line 45 and ground is greater than the sum of the threhold voltages of the Zener diode and the LED. IF these are correctly chosen, as for example a 26 volt green LED and a 9 volt Zener diode, the LED will light so long as a safe margin of charge remains in the battery and go out when it is time to recharge.

While this invention is particularly useful in starting small internal combustion engines for model airplanes, it is also useful in other applications where fast heating is required as, for example, where the rise in temperature is delayed by the high thermal capacity of the element to be heated or of material adjacent to it. Thus diesel engines for automotive use frequently require a pre-heating period before they will start. Obviously the more quickly this is done the better. The system here described would allow maximum heating effect for initial heating without danger of burning out the heating element.

I claim:

1. Circuit means for quickly heating a heatable element which may temporarily be in contact with an evaporatable liquid which prevents it from getting hot, comprising:
    1. means for sensing the resistance of said element to obtain a control voltage related to the temperature of said element,
    2. a battery source of heating current for said element which would be sufficient to overheat said heatable element if applied in the absence of said liquid,
    3. means for applying pulses of said heating current to said element, the pulses being of constant amplitude and variable duration, and
    4. means for varying the duration of said pulses in response to said control voltage so that longer pulses are applied during the presence of said liquid so as to speed up the evaporation of said liquid and shorter pulses are applied thereafter so as to maintain the temperature of said element below a predetermined value.

2. Apparatus of the kind described in claim 1 in which
    1. said means for applying pulses of said heating current includes a switching device connected in series with said heatable element and a multivibrator operable to control the on and off periods of said switching device, and
    2. in whch said control voltage varies the on and off periods of said multivibrator.

3. Apparatus of the kind described in claim 1 in which said heatable element is the glowplug of an engine designed for powering model airplanes and which is subject to flooding when the engine is primed.

4. A device for heating the glowplug of a model airplane internal combustion engine which is subject to flooding when the engine is primed, the liquid fuel preventing the glowplug from becoming sufficiently heated, comprising:
    1. a bridge network for sensing the resistance of the glowplug as a measure of its temperature,
    2. a direct current source of current for powering said device and for heating said glowplug, the voltage and current capacity of said source being sufficient to overheat said glowplug if applied directly thereto in the absense of said liquid fuel,
    3. means for applying pulses of said current to heat said glowplug, the effectiveness of said current being controllable,
    4. means for developing a control voltage which is related to the resistance of the glowplug as determined by said bridge network, and
    5. means for utilizing said control voltage to vary the effectiveness of said heating current so as to apply maximum heating power to said glowplug when said glowplug is cold and reducing its effectiveness as said glowplug reaches normal operating temperature whereby liquid fuel is rapidly evaporated from said glowplug and it reaches its operating temperature rapidly.

5. A device of the character described in claim 4 in which the heating current is applied to the glowplug through removable contactors which may generate erratic contact when being applied to produce heating current pulses which occur more frequently than normal so as to tend to overheat said glowplug comprising, in addition, means for developing a second control voltage which is related to the more frequent than noraml pulses, and means for utilizing said second control voltage to disable said source of heating current so as to prevent overheating of said glowplug.

6. A device of the character described in claim 4 in which the heating current is applied to the glowplug through removable contactors which may become short-circuited after removal comprising, in addition, means for sensing the short-circuited condition to produce an additional control voltage which exists only when a short circuit is present, and means for utilizing said additional control voltage to disable said source of heating current so as to minimize the flow of current through said short circuit from said source of heating current.

7. A device of the character described in claim 4 in which the source of heating current includes a battery and which includes, in addition, means applying energizing voltages from the battery to other components of the device only when the circuit is connected to the glowplug so that when the means for heating the glowplug is disconnected from the glowplug the storage battery is also disconnected from said other circuit means elements, whereby it is not necessary to turn the heating means off to conserve battery power when it has been so disconnected.

8. A device of the character described in claim 4 in which said device is connected to said glowplug by removable leads and in which the direct current for powering said device is derived from the charge in a large capacitor which is coupled to said direct current source through said glowplug, said removable leads and a diode, so that the device draws no stand-by current when said removable leads have been disconnected from said glowplug.

9. A device according to claim 4 in which said glowplug and a series resistor comprise a first arm of said bridge network and in which a large capacitor in series with other resistors comprise a second arm, said glowplug being connectable in said first arm by removable connectors, said control voltage being derived from conjugate points between said first and said second arms of said bridge, said heating current pulses being applied to said glowplug through the first arm of said bridge, said large capacitor serving to isolate the second arm of said network from said source when said glowplug is not connected in said first arm, and means charging said capacitor to a voltage which remains fairly constant over the operating cycle so that said capacitor has little effect on the operation of the bridge and stand-by currents are minimized.

10. A device of the character described in claim 4 in which said heating current is applied to said glowplug through removable contactors which may become short-circuited after removal to cause said control voltage to exceed its normal value,
   1. additional means responsive only to said control voltage when it exceeds its normal range of values,
   2. a transistor in circuit with said means for applying pulses of said heating current to control the effectiveness thereof, and
   3. means operative by a response of said additional means to cause said transistor to minimize the effectiveness of said heating current.

11. A device of the character described in claim 4 in which said heating current is applied to said glowplug through removable contactors which may become short-circuited after removal to cause said control voltage to exceed its normal value,
   1. additional means responsive only to said control voltage when it exceeds its normal range of values,
   2. a capacitor in circuit with said additional means which is charged when said additional means responds to a control voltage of excessive value,
   3. a transistor in circuit with said means for applying pulses of said heating current to control the effectiveness thereof,
   4. means utilizing the charge in said capacitor to control the operation of said transistor so as to minimize the effectiveness of said heating current in response to the presence of said charge, and
   5. means slowly discharging said capacitor so as to produce a succession of current pulses at spaced intervals so long as said short-circuit remains.

* * * * *